United States Patent [19]

Mitchell et al.

[11] Patent Number: 5,235,011
[45] Date of Patent: Aug. 10, 1993

[54] POLYOLEFIN POLYMERIZATION PROCESS, METHOD OF PRODUCING CATALYST, AND CATALYST

[75] Inventors: Kent E. Mitchell; David C. Miller, both of Bartlesville; Don W. Godbehere, Ochelata; Gil R. Hawley, Dewey, all of Okla.

[73] Assignee: Phillips Petroleum Company, Bartlesville, Okla.

[21] Appl. No.: 938,922

[22] Filed: Aug. 31, 1992

[51] Int. Cl.$^5$ .................... C08F 4/642; C08F 110/14
[52] U.S. Cl. .................... 526/125; 526/119; 526/127; 526/128; 526/142; 526/143; 526/151; 526/152; 526/348.4; 526/903; 502/107; 502/119; 502/125; 502/134
[58] Field of Search ............ 526/119, 125, 128, 142, 526/127, 143, 348.4; 502/107, 119, 125, 134

[56] References Cited

U.S. PATENT DOCUMENTS

| | | | |
|---|---|---|---|
| 4,394,291 | 7/1983 | Hawley | 252/429 B |
| 4,562,168 | 12/1985 | Lee | 502/107 |
| 5,151,397 | 9/1992 | Mitchell et al. | 502/107 |

FOREIGN PATENT DOCUMENTS 0136660 4/1985 European Pat. Off. ............ 526/125

OTHER PUBLICATIONS

Phillips Petroleum Case 33042US, filed Aug. 31, 1992.

*Primary Examiner*—Fred Teskin
*Attorney, Agent, or Firm*—Marianne H. Michel

[57] ABSTRACT

A process for preparing a polymerization catalyst useful for the polymerization of olefins is provided comprising contacting a metal dihalide compound wherein the metal is selected from Group 2 and Group 12 of the Periodic Table and a transition metal compound which is a hydrocarbyloxide of a transition metal selected from Group 4 and Group 5 to form a first catalyst component; contacting the first catalyst component with at least one organoaluminum precipitating agent, wherein at least at the commencement of this step, the temperature at which such contacting is carried out is greater than about 70° C. to about 150° C. to form a solid product, and contacting the solid product with an activating agent to form a catalyst. Other aspects of the invention provide a catalyst prepared by the above described method and a polymerization process employing the thus prepared catalyst.

21 Claims, No Drawings

POLYOLEFIN POLYMERIZATION PROCESS, METHOD OF PRODUCING CATALYST, AND CATALYST

BACKGROUND OF THE INVENTION

This invention relates to transition metal catalysts and methods for their production and use in the polymerization of olefins.

In the production of polyolefins, such as for example polyethylene, polypropylene, ethylene-butene copolymers, polymethylpentene, etc., an important aspect of the various processes and catalysts used to produce such polymers is the productivity. By productivity is meant the amount or yield of solid polymer that is obtained by employing a given quantity of catalyst. If the productivity is high enough, then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary. High productivities are also desirable in order to minimize catalyst costs.

In the polymerization of propylene and higher olefins, it is desirable to produce isotactic polymer. Atactic polymer and low molecular weight polymer are soluble in the olefin monomer. High levels of the undesirable soluble polymer make operation of the polymerization reactor difficult if not impossible, especially for a continuous operation. Therefore, control of the amount of soluble polymer produced during polymerization is essential to a commercially viable process.

Soluble polymer production in high productivity catalysts is a function of both catalyst preparation and polymerization conditions. The changes in polymerization conditions, to decrease soluble polymer formation, include either the addition of external modifiers to the polymerization cocatalyst system, or the reduction of polymerization temperature. Reducing the polymerization temperature has the adverse effect of reducing catalyst productivity.

However, it would be desirable to develop new and improved catalysts and polymerization processes which provide relatively high catalyst productivities and lower soluble polymer levels.

SUMMARY OF THE INVENTION

An object of the present invention is to provide a process to produce olefin polymerization catalysts having high productivity.

Another object of the present invention is to provide improved olefin polymerization catalysts that produce polymers with reduced soluble polymer content.

Another object is to provide an improved olefin polymerization process for producing isotactic polymers.

In accordance with one aspect of the present invention, a process preparing a catalyst is provided, which comprises contacting a metal dihalide compound and a transition metal compound to form a first catalyst component, wherein the metal in the metal dihalide compound is selected from Group 2 and Group 12 of the Periodic Table and the transition metal compound is a hydrocarbyloxide of a transition metal selected from Group 4 and Group 5 of the Periodic Table; contacting the first catalyst component with at least one organoaluminum precipitating agent to form a solid product, wherein, at least at the commencement of this step the temperature at which such contacting is carried out is greater than about 70° C. to about 150° C.; and contacting the solid product with an activating agent to form a catalyst. In a preferred embodiment, the metal dihalide compound and transition metal compound are also contacted with a phenol.

In accordance with other aspects of the invention, a catalyst produced by the above described process and a polymerization process employing the catalyst are provided. The polymerization process can optionally also employ a cocatalyst.

DETAILED DESCRIPTION OF THE INVENTION

The metal in the metal dihalide compound is selected from Group 2 and Group 12 metals of the Periodic Table. As used herein by the term "Periodic Table" is meant the Periodic Table of the Elements shown as the new IUPAC form on the inside front cover of *Handbook of Chemistry and Physics*, 70th Edition, CRC Press, Inc. (1990).

As noted above, the metal in the metal dihalide compound is selected from Group 2 and Group 12 metals, such as for example beryllium, magnesium, calcium and zinc. Some suitable metal dihalide compounds include for example, beryllium dichloride, beryllium dibromide, magnesium dichloride, magnesium dibromide, magnesium diiodide, calcium dichloride, calcium dibromide, zinc dichloride, and zinc difluoride. Dichlorides are preferred dihalides, and magnesium dichloride is most preferred because it is readily available and relatively inexpensive and has provided excellent results.

The transition metal compound is a hydrocarbyloxide  of a transition metal selected from Groups 4 and 5 of the Periodic Table. Preferably the transition metal compound is selected from the hydrocarbyloxides of titanium, zirconium, and vanadium, although other transition metals can be employed. Titanium tetrahydrocarbyloxides are the most preferred compounds because they produce excellent results and are readily available. Suitable titanium tetrahydrocarbyloxide compounds include those expressed by the general formula $$Ti(OR)_4$$

wherein each R is individually selected from an alkyl, cycloalkyl, aryl, alkaryl, and aralkyl hydrocarbon radical containing from 1 to 20 carbon atoms per radical and each R can be the same or different. Titanium tetrahydrocarbyloxides in which the hydrocarbyl radical contains from 1 to 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, and titanium tetraphenoxide.

Of the titanium tetrahydrocarbyloxides, titanium tetraalkoxides are preferred and titanium tetra-n-butoxide is particularly preferred because of the excellent results obtained employing this material. Titanium tetra-n-butoxide is also generally available at a reasonable cost.

The molar ratio of the transition metal compound to the metal dihalide compounds can be selected over a relatively broad range. Generally the molar ratio is within the range of about 0.1:1 to about 10:1, preferably from 0.2:1 to 2:1.

According to a preferred embodiment, a phenol is also employed in preparing the first catalyst component. Such a phenol includes substituted as well as unsubstituted phenolic compounds. Typical examples include phenol, o-methylphenol, m-methylphenol, p-methylphenol, 4-phenylphenol, o-fluorophenol, m-fluorophenol, p-fluorophenol, p-sec-butylphenol, p-ethylphenol, p-methoxyphenol, and mixtures thereof. The preferred phenols have 6 to 12 carbon atoms per molecule. Of those phenols, 4-phenylphenol is the most preferred.

The molar ratio of the phenol employed relative to the transition metal compound can vary over a relatively broad range. Generally the molar ratio is within a range of from about 0.1:1 to about 10:1 and preferably from 0.2:1 to 5:1.

The metal dihalide compounds, the transition metal compounds, and the phenol as above described, can be reacted in the presence of a liquid diluent or solvent, or when at least one of the reagents is in the liquid state during the reaction, the use of diluent can be omitted. The metal dihalide compound, the transition metal compound, and the phenol employed in the present invention are normally mixed together in a suitable dry (essential absence of water) diluent or solvent, which is essentially inert to these components and the product produced. By the term "inert" is meant that the diluent does not chemically react with the dissolved components such as to interfere with the formation of the product of the stability of the product once it is formed. Such diluents include, for example, n-pentane, n-hexane, n-heptane, methylcyclohexane, toluene, and xylenes. Aromatic solvents are preferred because the solubility of the metal dihalide compound and the transition metal compound is higher in aromatic solvents as compared to aliphatic solvents, particularly at low temperatures. Xylenes are most preferred.

Generally the amount of solvent or diluent employed can be selected over a broad range. Usually the amount of solvent or diluent is within the range of about 1 to about 100 cc per gram of metal dihalide compound, preferably from 20 to 100 cc per gram.

Temperatures for contacting the metal dihalide compound and the transition metal compound are generally within the range of from about 0° C. to about 150° C. and preferably from 10° C. to 150° C. The contacting temperatures employed could be higher if the pressure employed is above atmospheric pressure.

The pressure employed during contacting of the metal dihalide compound and the transition metal compound does not appear to be a significant parameter and can vary broadly. Generally the pressure is within the range of about 1 psi to about 1000 psi, preferably 1 psi to 100 psi.

Generally, the time required for contacting the metal dihalide compound and the transition metal compound is within the range of about 5 minutes to about 10 hours, although in most instances a time within the range of 15 minutes to 3 hours is sufficient. Following the contacting operation, the resulting solution can be filtered to remove any undissolved material or extraneous solid, if desired.

In a preferred embodiment, water is employed in preparing the first catalyst component. Generally, 0.5 to 1.5 moles of water per mole of metal dihalide are employed.

The organoaluminum precipitating agent contains at least one hydrocarbyl radical, wherein the hydrocarbyl radical is selected from hydrocarbyl radicals selected from alkyl, cycloalkyl, aryl, alkaryl, and aralkyl hydrocarbon radicals containing 1 to 20 carbon atoms per radical. Typical examples include trimethyl aluminum, triethylaluminum, methylaluminum dibromide, ethylaluminum diiodide, dimethylaluminum chloride, diethylaluminum chloride, diisopropylaluminum chloride, diisobutylaluminum chloride, dodecylaluminum dibromide, dimethylaluminum bromide, methyl-p-propylaluminum bromide, di-n-octylaluminum bromide, dicyclohexylaluminum bromide, di-n-decylaluminum chloride, ethylisobutylaluminum chloride, diphenylaluminum chloride, dieicosylaluminum chloride, di-n-propylaluminum chloride, methylaluminum sesquibromide, ethylaluminum sesquiiodide, ethylaluminum sesquichloride, and mixtures thereof. Based on higher catalyst productivity, organoaluminum halides are preferred. Of these compounds, dialkylaluminum chlorides are preferred. Diethylaluminum chloride and ethylaluminum sesquichloride are readily available and have been employed with good results, and are especially preferred.

It has been found that the type of organoaluminum precipitating agent employed in catalyst preparation can affect the production of undesirable soluble polymer during polymerization. Diethylaluminum chloride is especially preferred for reducing soluble polymer levels.

The molar ratio of the transition metal compound to the organoaluminum precipitating agent can be selected over a relatively broad range. Generally, the molar ratio is within a range of from about 0.1:1 to about 10:1 and preferably within a range of 0.1:1 to 3:1. A molar ratio within the latter range usually produces a catalyst which can be employed as an especially active olefin polymerization catalyst.

The contacting of the first catalyst component and the organoaluminum precipitating agent can be carried out either in the presence of a liquid diluent, or when at least one of the reagents is in the liquid state, in the absence of such diluent. Preferably, a liquid solution of the metal dihalide compound and the transition metal compound is contacted with a hydrocarbon solution of the organoaluminum precipitating agent. Diluents or solvents which can be employed in preparing the first catalyst component, as described above, are also suitable for contacting the first catalyst component and the organoaluminum precipitating agent.

It has been found that maintaining a dispersion of inert gas, such as nitrogen or argon, most preferably nitrogen, improves mixing while contacting the first catalyst component and the precipitating agent. The dispersion also has the effect of reducing the amount soluble polymer formed during polymerization of olefins such as 4-methyl-1-pentene. The dispersion system is affixed to the feedstock inlet. The dispersion system comprises two concentric tubes which allow the organoaluminum feed to enter the reactor through one tube, while inert gas enters the reactor through the other tube. The dispersion system is located above the level of the liquid in the reactor. The flow of inert gas causes a turbulent region at the end of the tube which disperses the feed entering the reactor into small droplets.

The flow rate of the inert gas can vary broadly. Generally the flow rate is in the range of about 0.1 to about 20 liters/minute, preferably in the range of about 1 to about 15 liters/minute, and most preferably in the range of 2 to 10 liters/minute.

The temperature employed while contacting the first catalyst component and the organoaluminum precipitating agent is, at least at the commencement of this contacting step and most preferably as maintained for the time indicated below, greater than about 70° C. to about 150° C., preferably within the range of about 80° C. to about 150° C., and most preferably within the range of 85° C. to 145° C.

It has been found that when the catalyst is used in the polymerization of olefins such as 4-methy-1-pentene, the temperature employed during the precipitation step of catalyst preparation can affect the amount of soluble polymer produced. The temperature employed is high enough to reduce the amount of soluble polymer produced, and has the additional effect of producing a fibrous catalyst as opposed to discrete particles. Heat is evolved when the first catalyst component and the organoaluminum precipitating agent are contacted and the contacting rate can be adjusted as required to preferably maintain the desired temperature. Additional cooling can also be employed in order to maintain a relatively constant temperature. It is noted that the order of addition is not important and either component can be added to the other.

The pressure employed while contacting the first catalyst component and the organoaluminum precipitating agent can be selected over a broad range. Generally the pressure is within the range of about 1 psi to about 1000 psi, preferably 1 psi to 100 psi.

The first catalyst component is contacted with the organoaluminum precipitating agent for a sufficient time at the above mentioned temperature, generally within a range of about 5 minutes to about 10 hours, preferably from 15 minutes to 3 hours, to insure that contacting of the components is complete. Precipitation of the solid product produces a slurry. The slurry can be stirred or agitated during precipitation.

It has been found that the precipitation efficiency can be improved, i.e. the amount of solid product is increased, by contacting the slurry containing the solid product with a hydrocarbon before contacting with the activating agent. Generally the hydrocarbon is an aliphatic compound containing from 4 to 12 carbon atoms such as for example, n-pentane, n-hexane, n-heptane, cyclohexane, octane, and decane. The preferred hydrocarbons are n-hexane and n-heptane. The conditions, i.e. temperature, pressure, and time, suitable for contacting the hydrocarbon and the slurry containing the solid product are the same as those suitable for contacting the first catalyst component and the organoaluminum precipitating agent.

The amount of hydrocarbon employed can be selected over a broad range. Generally the amount of hydrocarbon is within the range of about 1 to about 100 grams per gram of organoaluminum precipitating agent, preferably from about 5 to about 80 grams per gram, and most preferably from 10 to 60 grams per gram.

Thereafter the solid product can be recovered from the slurry by filtration or decantation. The solid product can then be washed with a suitable material, such as a hydrocarbon, to remove any soluble material which may be present. If the solid product is decanted, the slurry can be stored under dry nitrogen or the solid product can be dried and then stored under nitrogen.

An ester can optionally be contacted with the first catalyst component or with the solid product after precipitation of such solid product. Esters that can be used include alkyl or aromatic esters of linear or cyclic carboxylic acids having from 2 to 20 carbon atoms. Examples of suitable esters include methyl formate, ethyl formate, methyl acetate, ethyl acetate, n-propyl acetate, n-butyl acetate, ethyl octanoate, n-butyl-eicosanoate, methyl anisate, methyl benzoate, ethyl benzoate, ethyl p-methoxybenzoate, methyl p-toluate, diethyl carbonate, dimethyl maleate, methyl ethyl carbonate, di-(3-methylbutyl)carbonate, diphenyl carbonate, ethyl toluate, ethyl p-butoxybenzoate, ethyl p-methoxybenzoate, butylbenzoate, ethyl o-chlorobenzoate, ethyl naphthenate, ethyl cyclohexanoate, ethyl pivalate, and mixtures thereof. The preferred esters are those having 8 to 12 carbon atoms per molecule. Ethyl benzoate is especially preferred for preparing a catalyst having high productivity and selectivity for the more desirable insoluble polymer product.

The molar ratio of ester employed relative to the transition metal compound can vary from about 0.1:1 to about 5:1, preferably from 0.2:1 to 3:1.

The activating agent comprises at least one halogen-containing compound of an element selected from Groups 4, 5, 14, and 15 of the Periodic Table capable of adding halogen to the catalyst. The activating agent compounds preferably comprise chlorine-containing compounds of silicon and titanium. The currently preferred activating agent comprises titanium tetrachloride and trichlorosilane. The ratio of the titanium tetrachloride to the trichlorosilane can vary over a wide range. It is currently preferred that the weight of titanium tetrachloride is greater than that of the trichlorosilane. In a currently most preferred embodiment, the activating agent is a mixture of titanium tetrachloride, trichlorosilane, and silicon tetrachloride. Here again the relative amounts of the various components of the activating agent can vary, however, it is generally preferred that the trichlorosilane be employed in a greater weight basis than the silicon tetrachloride and that titanium tetrachloride be employed in a greater weight basis than the trichlorosilane. Typical values for the weight ratio of the titanium tetrachloride:trichlorosilane:silicon tetrachloride would be in the range of about 3:2:1 to about 5:4:1.

While the weight ratio of the activating agent to the solid product can be selected over a relatively broad range, the weight ratio of the activating agent to the solid product is generally within a range of about 0.1:1 to about 100:1 and preferably from 0.5:1 to 60:1. Following the treatment of the solid product with the activating agent, the surplus activating agent can be removed by washing the solid catalyst with a dry (essential absence of water) liquid such as a hydrocarbon of the type previously discussed, n-hexane, or xylene for example. The thus activated catalyst can be stored under an inert atmosphere such as dry nitrogen.

Generally the reaction of the solid product and the activating agent can be carried out neat or in a liquid medium in which the activating agent is soluble. Any suitable diluent can be employed. Examples include normally liquid hydrocarbons such as n-pentane, n-hexane, n-heptane, cyclohexane, benzene, and xylene.

The temperature employed in contacting the solid product and the activating agent can be selected over a relatively broad range, generally in the range of about 0° C. to about 150° C., preferably 20° C. to 120° C.

In a preferred embodiment, the activation is carried out at a pressure of at least 70 psi. A particularly effective pressure range would be about 70 psi to about 95 psi, or more preferably 85 psi to 95 psi.

The contacting time of the solid product and the activating agent can be selected over a broad range and generally is within the range of about 10 minutes to about 10 hours, preferably from 15 minutes to 3 hours. It is noted that the order of addition is not important and either component can be added to the other.

If desired, the catalyst can be admixed with a particulate diluent such as, for example, silica, silica-alumina, silica-titania, magnesium dichloride, magnesium oxide, polyethylene, polypropylene, or poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of about 20:1 to about 2:1 and use of a particulate diluent can facilitate charging of the catalyst to the reactor.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having from 2 to 18 carbon atoms are most often used.

The present catalysts are particularly useful for the polymerization of 4-methyl-1-pentene and are especially well suited for producing isotactic polymethylpentene, providing high productivity as well as low soluble polymer formation.

While it may not be necessary in all instances to employ a cocatalyst with the catalyst of the present invention, the use of cocatalysts is recommended for best results. The cocatalysts suitable for use in accordance with the invention can be selected from among the hydrides and organometallic compounds of metals of Groups 1, 2, 12, and 13 of the Periodic Table. Some typical examples include lithium alkyls, Grignard reagents, dialkyl magnesium compounds, dialkyl zinc compounds, and organoaluminum compounds. Of the organometallic cocatalysts, organoaluminum compounds are preferred, with the most preferred organoaluminum cocatalysts being compounds of the formula $R'_3Al$ wherein each $R'$ is individually selected from hydrocarbyl radicals containing 1 to 20 carbon atoms per radical. Typical examples include, trimethylaluminum, triethylaluminum, triisopropylaluminum, tridecylaluminum, triesosylaluminum, tricyclohexylaluminum, triphenylaluminum, and 2-methylpentyldiethylaluminum. Triethylaluminum is preferred since this compound has produced excellent results.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transistion metal compound of the first catalyst component is within a range of about 1500:1 to about 1:100, preferably from 200:1 to 1:10. For catalyst systems wherein the cocatalyst comprises at least one organoaluminum compound, typically there is employed about 0.25 to about 15 milligrams of the titanium-containing catalyst per millimole of organoaluminum cocatalyst.

In some cases it may be desirable to use a multi-component cocatalyst system comprising triethylaluminum and either aromatic esters such as ethylanisate, ethylbenzoate and methyl-p-toluate, etc.; or silanes such as diphenyl dimethoxysilane, triphenyl ethoxysilane, methyl triethoxysilane, etc.

In general the catalyst of this invention can be used with the same types of cocatalyst systems and in the same manner as disclosed in U.S. Pat. Nos. 4,588,703, 4,394,291, and 4,477,588, which are incorporated herein by reference.

The polymerization process according to the present invention can be conducted in a solution phase process, in the presence or absence of an inert hydrocarbon diluent, in a particle form process, or in a gas phase process.

The polymerization process employing the catalysts and cocatalysts as above described can be performed either batchwise or continuously. In a batch process, for example, a stirred autoclave is prepared for use by first purging with an inert gas such as nitrogen and then with a suitable compound, such as isobutane for example. When the catalyst and cocatalyst are employed, either can be charged to the reactor first or they can be charged simultaneously through an entry port under an isobutane purge. After closing the entry port, hydrogen, if used, is added, and then a diluent, if used, is added to the reactor. The reactor is heated to the desired reaction temperature, which for polymerizing 4-methyl-1-pentene, for example, is, generally within a range of about 20° C. to about 120° C. and the monomer is then admitted and maintained at a partial pressure within a range of about 5 psig to about 725 psig for best results. At the end of the designated reaction period, the polymerization reaction is terminated and the unreacted olefin and diluent can be vented. The polymer can then be collected as a free-flowing white solid and dried to obtain the product.

In a continuous process, for example, a suitable reactor such as a loop reactor can be continuously charged with suitable quantities of solvent or diluent, catalyst, cocatalyst, polymerizable compounds and hydrogen, if any, and in any desirable order. The reactor product can be continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, and extrusion of film.

The following examples will serve to show the present invention in detail by way of illustration and not by way of limitation.

EXAMPLES

The first example compares the effect of precipitation temperature on the soluble polymer produced during polymerization. It was found that increasing the temperature during precipitation reduces the amount of soluble polymer produced during polymerization. The soluble polymer is the atactic and low molecular weight polymer soluble in the monomer.

The second example compares the relative effectiveness of various organoaluminum precipitating agents employed in catalysts prepared at temperatures in accordance with the invention. Good productivity and lower soluble polymer levels were attained with diethylaluminum chloride.

The third example demonstrates the improvement attained by employing an inert gas (nitrogen) dispersion during precipitation in accordance with the invention.

Catalysts were prepared with a 100 gallon reactor, a 10 gallon reactor, or on a bench scale level in glass bottles, as indicated in each example. The 100 gallon and 10 gallon reactor were Pfaudler reactors each equipped with a retreat curve agitator. Each reactor was also equipped with a nitrogen dispersion system on the feedstock inlet. The dispersion system consists of 2 concentric tubes which allowed the feed to enter the reactor through the outer tube while nitrogen entered the reactor through the inner tube. The nitrogen creates a turbulent region at the end of the tube which disperses the feed entering the reactor.

A typical batch of the catalyst was prepared with the 100 gallon reactor as follows. To the reactor, 36 gallons of xylene and 5610 grams anhydrous $MgCl_2$ were added, followed by 1324 ml of water added over a period of about 30 minutes. The resulting mixture was then heated to a temperature in the range of 40° C. to 50° C., stirred for about 80 minutes, and allowed to cool to about 30° C. 7560 grams 4-phenylphenol were added, followed by the addition of 23 pounds of titanium tetra-n-butoxide. The reactor and its contents were then heated to 90° C. to 100° C. and stirred for 15 minutes. 4.8 pounds of ethylbenzoate were added and the temperature was maintained at 90° C. to 100° C. for about 45 minutes. Nitrogen dispersion was then begun by passing nitrogen into the reactor through the nitrogen dispersion system at a flow rate of 4.9 liters/minute. The precipitating agent, 63 lbs ethylaluminum sesquichloride, was added over a period of 1 hour and 3 minutes at the temperature ("precipitation temperature") designated in the examples. The nitrogen dispersion was turned off and the resulting slurry was stirred for 30 minutes. Then 15 gallons of hexane were added to the slurry. The slurry was cooled to about 30° C., the solids were allowed to settle, and the liquid was decanted. The solids were subjected to four washings, each using 45 gallons hexane. The wash step involved contacting the solids and the hexane and then decanting the hexane. The solids were then divided and stored in 5 gallon Carboys for later use.

The solids were then activated with an activating agent to produce the catalyst. A large batch of activating agent was prepared and used in activating all catalysts described. In a large cylinder, 59 lbs trichlorosilane, 24 lbs, silicon tetrachloride, and 109 lbs titanium tetrachloride were combined to produce the activating agent. The solids were activated in a 10 gallon Pfaudler reactor. The reactor was purged two times with nitrogen. The solids were charged and mixed for 10 minutes. To the solids, 20 lbs of activating agent were added and the reactants were heated to about 100° C. for 1 hour at a pressure of 85-95 psig. The mixture was cooled to 30° C. and the liquid decanted. The thus activated solids were washed four times with 5 gallons of hexane to produce the catalyst.

A typical batch of the catalyst was prepared with the 10 gallon reactor as follows. To the reactor, 2.5 gallons of xylene and 561 grams anhydrous $MgCl_2$ were added, followed by addition of 132 ml of water over a period of about 30 minutes. The resulting mixture was then heated to a temperature in the range of 40° C. to 50° C., stirred at that temperature for about 80 minutes and allowed to cool to about 30° C. 76 grams 4-phenylphenol were then added, followed by the addition of 2.5 pounds of titanium tetra-n-butoxide. The reactor and its contents were then heated to 90° C. to 100° C., stirred for about 15 minutes, and then 0.5 pounds of ethylbenzoate were added. The resulting mixture was maintained at 90° C. to 100° C. for about 45-60 minutes. Nitrogen dispersion was begun by passing nitrogen into the reactor through the nitrogen dispersion system at a flow rate of 4.9 liters/minute. The precipitating agent, 6.3 lbs ethylaluminum sesquichloride, or the organoaluminum compound indicated, was added through the nitrogen dispersion system over a period of 1 hour and 3 minutes at a temperature of 100° C. The nitrogen dispersion was stopped and the resulting slurry was stirred for 30 minutes. Approximately 2 to 5 gallons of hexane were added to the slurry. The slurry was cooled to about 30° C., the solids were allowed to settle and the liquid was decanted. The solids were subjected to four washings, each using about 5 gallons of hexane.

To the washed solids, 20 lbs of activating agent described above, were added. The solids and activating agent were heated to 100° C. and the pressure was maintained at 85 psig for 60 minutes. The thus activated solids were cooled to about 30° C. and washed 4 times with hexane to produce the catalyst.

Bench scale catalysts were produced in glass bottles. Raw materials were transferred to the bottle via syringes or nitrogen pressure through needles. The catalysts were washed by allowing the catalyst to settle and decanting the supernatant liquid through a needle. Heating was accomplished in a controlled temperature oil bath. Thermocouples were inserted through the bottle septum to directly measure the temperature of the contents of the bottle. The solvent charged during precipitations was preheated to the same temperature as the slurry to avoid large changes in the slurry temperature.

A typical batch of the catalyst was prepared in a glass bottle as follows. To a glass bottle, 153 grams xylene and 1.75 grams anhydrous $MgCl_2$ were added, followed by the addition of 0.43 grams water over a period of about 30 minutes. The resulting mixture was then heated to a temperature in the range of 40° C. to 50° C., stirred at that temperature for about 80 minutes, and allowed to cool to about 30° C. 0.5 grams 4-phenylphenol were then added, followed by the addition of 3.28 grams titanium tetra-n-butoxide. The bottle and its contents were heated to 90° C. to 100° C., and stirred for 15 minutes. 0.53 grams ethylbenzoate were added and the temperature was maintained at 90° C. to 100° C. for about 45-60 minutes. The bottle and contents were heated to a temperature of 100° C. to 120° C. and the precipitating agent, i.e. 9.0 g of the indicated organoaluminum compound was added over a period of 1 hour and 3 minutes. Then 240-260 grams diluent (hexaneor heptane), heated to a temperature of 100° C. to 120° C., were changed to the bottle, and the contents were mixed for 30 minutes at a temperature of 100° C. to 120° C. The mixture was cooled to about 30° C. The solids were allowed to settle and the liquid was decanted. The solids were subjected to four washings with hexane.

The wash step involved contacting the solids and the hexane and then decanting the hexane.

The solids were activated with the above described activating agent. To the solids, approximately 550–700 grams activating agent were added. The resulting mixture was heated to approximately 100° C. for 1 hour. The thus activated solids were then cooled to about 30° C. and washed 4 times with hexane to produce the catalyst.

The catalysts were employed in the polymerization of 4-methyl-1-pentene. The polymerizations were carried out in a one gallon stirred stainless steel autoclave equipped with automatic temperature control. Monomer was dried over alumina before charging to the reactor. Hydrogen added to the reactor was measured as the pressure drop over a 300 mL vessel. To the clean reactor, purged with nitrogen, at room temperature, approximately 1350 g of liquid 4-methyl-1-pentene (4MP1) was charged to the reactor. The plug on the head of the reactor was removed while the reactor was purging with nitrogen, and 8.4 ml of triethylaluminum cocatalyst (approximately 4.6 mmol/L in toluene) were added, followed by a weighed amount of dried catalyst. The reactor was sealed and the desired amount of hydrogen, approximately 25 psig pressure drop over a 300 mL vessel, was added. The reactor was stirred for one minute and nitrogen was added to bring the pressure of the reactor to approximately 10 psig. The reaction mixture was then brought to about 50° C. and maintained for about 1 hour. The reactor was cooled by venting and using cooling water. The liquid remaining in the reactor was drained from the reactor through a bottom valve into a tared aluminum pan, the monomer was evaporated leaving the soluble polymer i.e. atactic and low molecular weight polymer, and the soluble polymer was weighed. The solid polymer was removed from the reactor, placed in a tared aluminum pan and weighed before and after drying.

In the following tables;

Precipitation temperature is the temperature at the commencement of the precipitation step in °C.

Solubles is the concentration of 4-methyl-1-pentene solubles. This measurement is a function of monomer conversion. Monomer conversion is not the same for every test, and the measurements were adjusted to a monomer conversion level of 10 percent.

The adjusted solubles were determined using the following formulas.

Dissolved polymer is the weight in grams of the solids remaining after drying the liquid fraction recovered from the reactor.

Dissolved polymer includes atactic and low molecular weight polymer dissolved in the monomer.

Wet polymer is the weight in grams of the wet polymer as it is recovered from the reactor.

Solid polymer is the dry weight in grams of the solid polymer.

Monomer conversion $$\text{conv.} = \frac{(g \text{ dissolved polymer}) + (g \text{ solid polymer})}{(g \text{ 4MP1 added initially to reactor})}$$

Concentration of the soluble polymer in the monomer as weight percent $$P[w] = \frac{(g \text{ dissolved polymer})100}{[(g \text{ 4MP1 initially added to reactor}) - (g \text{ wet polymer})]}$$

Adjusted solubles to 10% as weight percent $$\text{Adj. solubles} = P[w] \cdot \frac{10}{\text{conv.}}$$

Productivity in grams polymer/gram catalyst/hour $$\text{Productivity} = \frac{(g \text{ dissolved polymer}) + (g \text{ solid polymer})}{(g \text{ solid catalyst}) \cdot (\text{time in hours})}$$

Decanted catalyst is expressed in weight percent $$\frac{g \text{ dry catalyst}(100)}{g \text{ decanted slurry}}$$

EXAMPLE I

A series of catalysts was prepared to determine the effect of conducting the precipitation step at various temperatures. The catalysts in Runs 101–106 were prepared in a 100 gallon Pfaudler reactor as described above using precipitation temperatures indicated in Table I. Each batch of the resulting solids was separated into 5 gallon portions which were activated in a 10 gallon Pfaudler reactor.

TABLE 1

| Run | Precipitation Temperature (°C.) | Adjusted Solubles (wt. %) | Productivity (g/g/hr) | Decanted Catalyst (wt. %) |
|---|---|---|---|---|
| 101 | 30 | 3.52 | 10,500 | 36.8 |
| 102 | 40 | 2.85 | 13,000 | 30.8 |
| 103 | 50 | 1.88 | 13,600 | 27.3 |
| 104 | 50 | 1.61 | 13,200 | 24.1 |
| 105 | 70 | 1.15 | 11,200 | 4.4 |
| 106 | 100 | 0.77 | 14,200 | 2.3 |

Table 1 demonstrates that soluble polymer production was reduced by using higher temperatures at the commencement of the precipitation step in catalyst preparation, Runs 105–106. It was also shown that the productivity remained at a high level. A difference in catalyst structure was observed when the commencement of the precipitation step during catalyst preparation was carried out at higher temperatures. When the catalyst was precipitated at temperatures at or below 50° C., the catalyst's structure appears crystalline and forms discrete particles. At precipitation temperatures at or above 70° C., the catalyst structure was fibrous and fluffy and discrete particles were not apparent when observed under a microscope. Fluffiness increased with increasing temperature of precipitation, as indicated by the decrease in percent decanted catalyst. The percent decanted catalyst depended on the ratio of the weight of dry catalyst to the weight of the slurry. As the catalyst became more fluffy or fibrous, it filled up a larger volume of diluent, or slurry which therefore decreased the ratio of dry solid catalyst to slurry.

EXAMPLE II

A series of catalysts was prepared employing various precipitating agents at the precipitation temperature indicated in Table 2. The soluble polymer production and catalyst productivity were compared. The following aluminum compounds were employed as precipitating agents; ethylaluminum dichloride (EADC), triethylaluminum (TEA), dimethylaluminum chloride (DMAC), ethylisobutylaluminum chloride (EIBAC), di-n-decylaluminum chloride (DNDAC), ethylaluminum sesquichloride (EASC), diethylaluminum chloride (DEAC), di-n-propylaluminum chloride, (DNPAC), and diisobutylaluminum chloride. Catalysts in runs 209–213 were prepared in a 10-gallon Pfaudler reactor as described above. With the following exceptions, the catalysts in runs 201–208 were bench scale preparations carried out in glass bottles as described above. Runs 201, 202 and 208 were prepared using hexane as diluent after precipitation. Runs 203–207 were prepared using heptane as diluent after precipitation and the following reagent quantities in the first catalyst component; 74 grams xylene, 0.56 grams distilled water, 2.4 grams anhydrous MgCl₂, 0.68 grams 4-phenylphenol, and 2.96 grams titanium tetra-n-butoxide, combined in the manner described for bench scale catalyst preparation.

TABLE 2

| Run | Organo-aluminum | Precipitation Temperature (°C.) | Productivity (g/g/hr) | Adjusted Solubles (wt. %) |
| --- | --- | --- | --- | --- |
| 201 | EADC | 110 | 620 | 3.0 |
| 202 | TEA | 115 | 2,700 | 4.3 |
| 203 | DMAC | 120 | 3,100 | 5.1 |
| 204 | DNDAC | 120 | 8,300 | 4.1 |
| 205 | EIBAC | 120 | 9,300 | 1.9 |
| 206 | DNPAC | 120 | 13,100 | 2.0 |
| 207 | DIBAC | 120 | 8,800 | 1.4 |
| 208 | DEAC | 100 | 3,600 | 1.6 |
| 209 | EASC | 100 | 11,400 | 2.0 |
| 210 | DEAC | 100 | 5,200 | 1.4 |
| 211 | DEAC | 100 | 5,800 | 1.5 |
| 212* | DEAC | 100 | 18,800 | 1.4 |
| 213** | DEAC | 100 | 7,200 | 1.0 |

*Catalyst dried prior to activation
**No ethyl benzoate present

Table 2 demonstrates that catalysts precipitated with ethylaluminum sesquichloride, diethylaluminum chloride, ethylisobutylaluminum chloride, di-n-propylaluminum chloride, and diisobutylaluminum chloride produce a catalyst with relatively high productivity and low soluble polymer production. Table 2 also shows that diethylaluminum chloride produced consistently low levels of soluble polymer, even in the absence of ethyl benzoate.

EXAMPLE III

Catalysts were prepared to determine the effect of using a nitrogen dispersion during the precipitation step. Soluble polymer production was compared with and without the nitrogen dispersion.

All catalysts were precipitated at 100° C. during the entire precipitation step. A nitrogen dispersion was employed in Runs 302 and 303. A nitrogen purge, without the benefit of the inventive dispersion system, was employed in Run 300 by bleeding nitrogen into the headspace of the reactor. No nitrogen was admitted to the reactor in run 301. The catalysts in Run 300, 301, and 302 were prepared in 10 gallon reactors as described above. The catalyst in Run 303 was prepared in a 100 gallon reactor as described above. When employing the nitrogen dispersion, the nitrogen flow rate was 4.9 liters/minute in both reactors.

TABLE 3

| Run | Nitrogen Dispersion | Precipitation Temperature (°C.) | Adjusted Solubles (Wt. %) |
| --- | --- | --- | --- |
| 300 | Purge Only | 100 | 4.9 |
| 301 | None | 100 | 1.5 |
| 302 | Yes | 100 | 1.0 |
| 303 | Yes | 100 | 0.7 |

Table 3 demonstrates that employing a nitrogen dispersion during the precipitation step of catalyst preparation decreased the level of soluble polymer produced during polymerization.

While this invention has been described in detail for the purpose of illustration, it is not to be construed as limited thereby, but is intended to cover all changes and modifications within the spirit and scope thereof.

That which is claimed is:

1. A process for preparing a catalyst suitable for the polymerization of mono-1-olefins comprising:
   (1) contacting a metal dihalide compound and a transition metal compound to form a first catalyst component,
   wherein the metal in said metal dihalide compound is selected from Group 2 and Group 12 metals of the Periodic Table,
   wherein said transition metal compound is a hydrocarbyloxide of a transition metal selected from Group 4 and Group 5 of the Periodic Table;
   (2) contacting said first catalyst component and an organoaluminum precipitating agent to form a solid product,
   wherein said organoaluminum precipitating agent contains at least one hydrocarbyl radical selected from hydrocarbyl radicals containing 1 to 20 carbon atoms per radical, and
   wherein, at least at the commencement of this step (2), the temperature at which said contacting is carried out is 85° C. to 145° C.; and
   (3) contacting said solid product and an activating agent to form said catalyst,
   wherein said activating agent comprises at least one halogen-containing compound of an element selected from Groups 4, 5, 14, and 15 of the Periodic Table capable of adding halogen to said catalyst.

2. A process according to claim 1 wherein said temperature is maintained while said first catalyst component and said organoaluminum precipitating agent are contacted for a time of about 5 minutes to about 10 hours.

3. A process according to claim 1 wherein a phenol is also contacted in step (1).

4. A process according to claim 1 further comprising maintaining a dispersion of inert gas during step (2).

5. A process according to claim 1 further comprising contacting a hydrocarbon before step (3).

6. A process according to claim 3 wherein said metal dihalide is a magnesium dihalide;
   said transition metal compound is represented by the formula $Ti(OR)_4$ 

wherein each R is individually selected from alkyl, cycloalkyl, aryl, alkaryl, and aralkyl hydrocarbon radicals containing from 1 to 20 carbon atoms per radical and each R can be the same or different;
   said phenol contains from 6 to 12 carbon atoms per molecule;
   said organoaluminum precipitating agent is an organoaluminum halide; and
   said activating agent comprises chlorine-containing compounds of silicon and titanium.

7. A process according to claim 6 wherein said activating agent comprises $SiHCl_3$ and $TiCl_4$.

8. A process according to claim 7 wherein said activating agent further comprises $SiCl_4$.

9. A process according to claim 2 wherein said contacting in step (1) is carried out at a temperature of from about 0° C. to about 150° C., for a time within the range of about 3 minutes to about 10 hours;

said contacting in step (3) is carried out at a temperature of from about 0° C. to about 150° C., for a time within the range of about 10 minutes to about 10 hours.

10. A process according to claim 9 wherein the molar ratio of said transition metal compound to said metal dihalide compound is within the range of about 0.1:1 to about 10:1;

the molar ratio of said transition metal compound to said organoaluminum precipitating agent is within the range of about 0.1:1 to about 10:1; and the weight ratio of said activating agent to said solid product is within the range of about 0.1:1 to about 100:1.

11. A catalyst produced according to the process of claim 1.

12. A process for the polymerization of at least one mono-1-olefin monomer comprising contacting said at least one monomer under polymerization conditions with the catalyst of claim 11.

13. A process according to claim 12 wherein said at least one monomer comprises 4-methyl-1-pentene.

14. A process according to claim 13 wherein said at least one monomer is also contacted with a cocatalyst, wherein said cocatalyst is selected from the hydrides and organometallic compounds of metals of Groups 1, 2, 12, and 13 of the Periodic Table, and the molar ratio of said cocatalyst to said transition metal compound is within the range of about 1500:1 to about 1:100.

15. A process for preparing a polymerization catalyst comprising:

(1) contacting magnesium dichloride, 4-phenylphenol, and titanium tetra-n-butoxide to form a first catalyst component;

(2) contacting said first catalyst component and diethylaluminum chloride to form a solid product; and (3) contacting said solid product and an activating agent comprising $SiCl_4$, $SiHCl_3$, and $TiCl_4$ to form same catalyst;

wherein the molar ratio of said titanium tetra-n-butoxide to said magnesium dichloride is within the range of 0.2:1 to 2:1;

the molar ratio of said titanium tetra-n-butoxide to said diethylaluminum chloride is within the range of 0.1:1 to 3:1;

the weight ratio of said activating agent to said catalyst is within the range of 0.5:1 to 60:1; and wherein said contacting in step (1) is carried out at a temperature of from 10° C. to 150° C. and for a time within the range of 15 minutes to 3 hours;

said contacting in step (2) is carried out at a temperature of from 85° C. to 145° C. and for a time within the range of 15 minutes to 3 hours, said temperature being maintained for such time from the commencement of step (2); and said contacting in step (3) is carried out at a temperature of from 20° C. to 120° C. and for a time within the range of 15 minutes to 3 hours.

16. A process according to claim 15 wherein said contacting in step (2) further comprises maintaining a dispersion of nitrogen.

17. A process according to claim 15 further comprising contacting hexane or heptane before step (3).

18. A catalyst produced according to the process of claim 15.

19. A process for the polymerization of at least one mono-1-olefin monomer comprising contacting said at least one monomer under polymerization conditions with the catalyst of claim 18.

20. A process according to claim 19 wherein said at least one monomer comprises 4-methyl-1-pentene.

21. A process according to claim 20 wherein said at least one monomer is contacted with a cocatalyst, wherein said cocatalyst is selected from compounds represented by the formula $R'_3Al$ wherein each R' is individually selected from hydrocarbyl radicals containing 1 to 20 carbon atoms per radical.

* * * * *